UNITED STATES PATENT OFFICE.

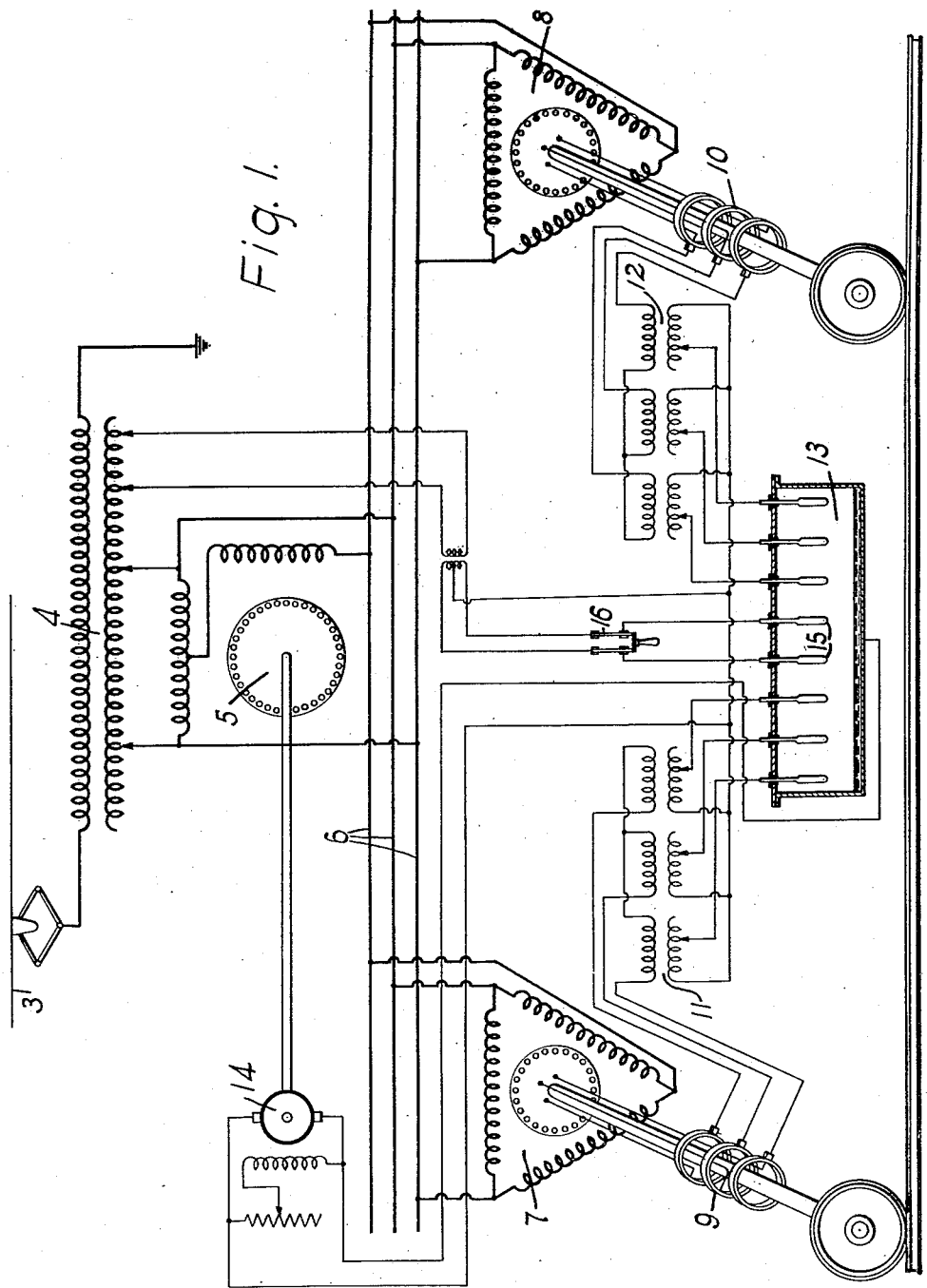

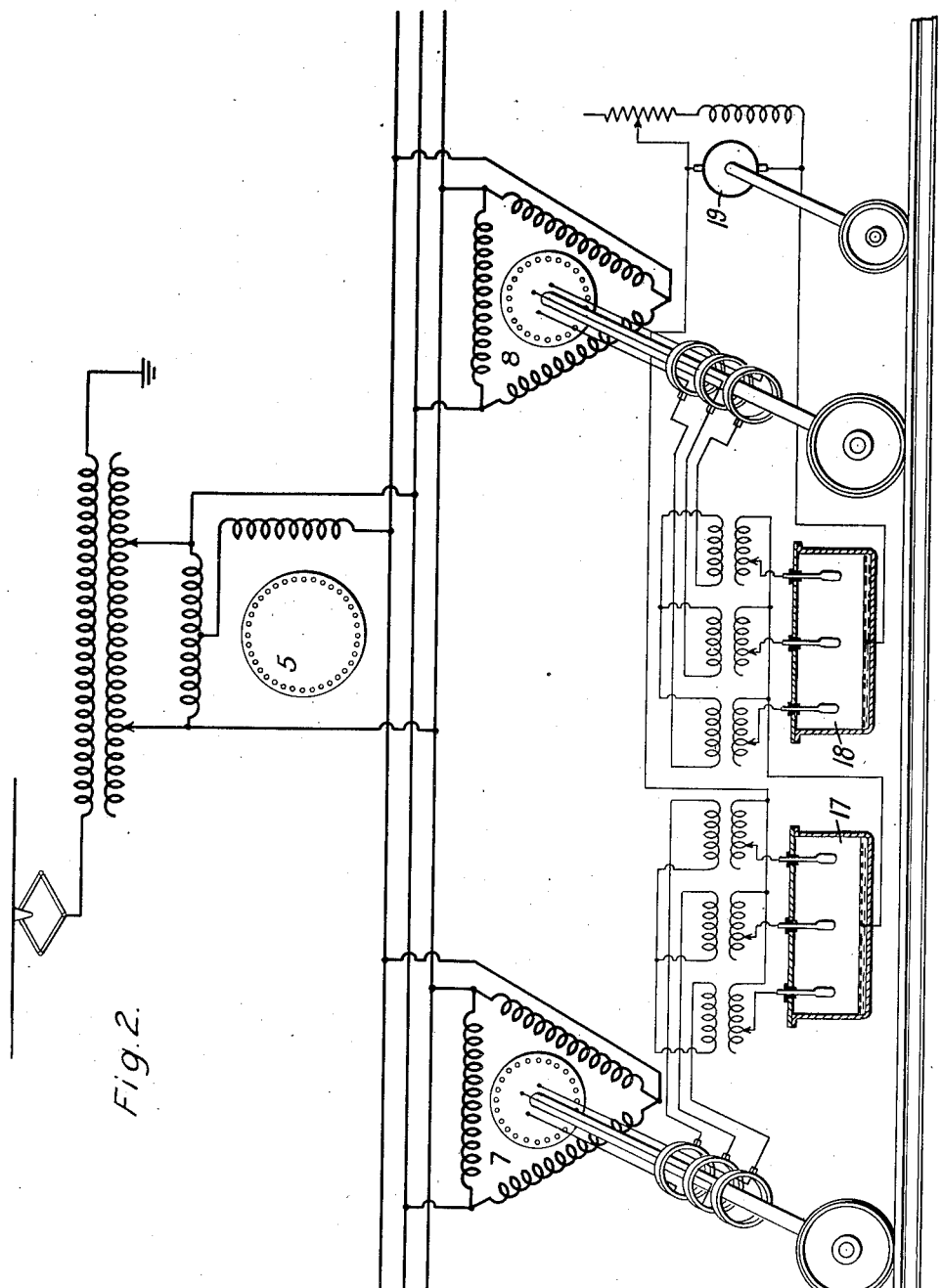

FRIEDRICH W. MEYER, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF LOCOMOTIVE CONTROL.

1,275,970.  Specification of Letters Patent.  Patented Aug. 13, 1918.

Application filed March 24, 1915. Serial No. 16,684.

*To all whom it may concern:*

Be it known that I, FRIEDRICH W. MEYER, a subject of the Emperor of Germany, and a resident of Pittsburgh, in the county of Allegheny and State of Pennsylvania, have invented a new and useful Improvement in Systems of Locomotive Control, of which the following is a specification.

My invention relates to electric railway systems, and it has for its object to provide means whereby electric locomotives, especially those of the split-phase type, may be conveniently started and whereby the speed and load distribution in a plurality of locomotives may subsequently be regulated.

In the operation of electric railway systems, especially of the interurban class, it is highly desirable to employ a single-phase high-voltage trolley wire for economy of transmission but it is difficult to provide suitable single-phase traction motors for such work. It has, therefore, been proposed to provide railway vehicles with suitable phase-converting devices for changing single-phase energy derived from the line into polyphase energy for supplying polyphase propulsion motors, preferably of the induction type. Difficulty is experienced in starting said phase-converting devices and also in adjusting the speed of said propulsion motors in an economical manner. Furthermore, as a slight difference in the slip of an induction motor causes a great difference in the mechanical output of the same, it frequently happens that slight differences in the diameters of the driving wheels on a vehicle cause marked unequal loading on the motors attached thereto. By my invention, I provide means whereby a phase-converting device may be started into operation in a simple manner and whereby the speed and the load distribution in propulsion motors of the type described may be simply and economically effected.

In the accompanying drawings; Figure 1 is a diagrammatic view of the electrical equipment of an electric vehicle embodying one form of my invention; and Fig. 2 is a diagrammatic view of a modification of the apparatus shown in Fig. 1.

Referring to the form of my invention shown in Fig. 1, energy from a single-phase high-voltage line 3 is supplied to an adjustable vehicle transformer 4 and thence flows to a phase converter or phase-splitter 5, preferably of the rotary type. From the phase-splitter 5, energy is supplied to suitable buses 6 in the form of polyphase current and thence flows to the primary windings of two propulsion motors 7 and 8 of the induction type. The secondary members of the motors 7 and 8 are of wound construction and their terminals are connected, respectively, to suitable sets of slip rings 9 and 10 from whence energy from the motors 7 and 8 may flow to suitable adjustable transformers 11 and 12 for supplying a rectifying device 13, preferably of the vapor arc type. Energy in the form of direct current from the rectifier 13 is supplied to a suitable adjustable-speed direct-current motor 14 mounted on the shaft of the phase converter 5. In addition to the working anodes, the rectifier 13 may be provided with a pair of auxiliary anodes 15 connected to a suitable portion of the secondary winding of the transformer 4 through a switch 16.

Having thus described my invention, the operation is as follows: At starting, the switch 16 is closed, whereupon single-phase energy is rectified in the rectifier 13 and supplied to the direct-current motor 14 for the starting of the phase converter 5. The phase converter 5 thereupon supplies polyphase energy to the buses 6, from whence it flows to the primary windings 7 and 8. At the outset, a high secondary voltage is desired in the induction motors for low-speed operation and, accordingly, the transformers 11 and 12 are given a low ratio of transformation. The secondary energy thereupon flows through the rectifier 13, is rectified, and supplied to the motor 14 which supplies mechanical energy to the phase converter 5, causing the latter to operate partially as an asynchronous generator and return the secondary energy of the motors 7 and 8 to the primary windings thereof. The load may be properly distributed between the motors 7 and 8 by maintaining a constant difference in the settings of the transformers 11 and 12. The motors 7 and 8 may obviously be accelerated by a reduction in the ratios of transformation of the transformers 11 and 12.

In the form of my invention shown in Fig. 2, the general arrangement of the phase-splitter 5 and of the main propulsion motors 7 and 8 is the same as shown in Fig. 1, with the exception that energy from the secondary windings of the motors 7 and 8, after being converted into direct current in suitable rectifiers 17 and 18, is supplied to a direct-current motor 19 mounted on a pony axle. The secondary energy of the motors 7 and 8 is therefore applied directly for the propulsion of the vehicle rather than being returned to the primary windings. Speed changes and load distribution are adjustable in the same manner as in the apparatus of Fig. 1.

While I have shown my invention in two distinct embodiments, it will be apparent to those skilled in the art that it is susceptible of various minor changes and modifications without departing from the spirit thereof and I desire, therefore, that no limitations shall be placed thereupon except such as are imposed by the prior art or are specifically set forth in the appended claims.

I claim as my invention:

1. In a single-phase motor aggregate, the combination with a polyphase induction motor and a phase-splitting device of the rotary type for converting single-phase energy into a form suitable for said polyphase induction motor, of a direct-current motor mechanically connected to said phase-splitter and a rectifying device connected to derive energy from the secondary circuit of said induction motor and to supply said energy to said direct-current motor, whereby energy derived from the secondary member in the speed regulation thereof may be returned to the primary member thereof.

2. In a single-phase motor aggregate, the combination with a polyphase induction motor and a phase-splitting device of the rotary type for converting single-phase energy into a form suitable for said polyphase induction motor, of a direct-current motor mechanically connected to said phase-splitter, a rectifying device connected to derive energy from the secondary circuit of said induction motor and to supply said energy to said direct-current motor, and means for supplying energy from said single-phase source to said rectifier, whereby said phase-splitter may be started and whereby energy derived from the secondary member of said induction motor in the subsequent speed regulation thereof may be returned to the primary winding thereof.

3. A system of electrical distribution comprising a source of alternating current, a converting dynamo-electric machine, an induction motor, connections from said source to said converting machine and to the primary winding of said motor, part, at least of said connections traversing said converting machine, a direct current motor mechanically coupled to said converting machine, and means for deriving energy in the form of alternating current from the secondary member of said motor, for rectifying said current, and for supplying the same to said direct current motor.

4. A system of electrical distribution comprising a source of alternating current, a converting dynamo-electric machine, an induction motor, connections from said source to said converting machine and to the primary winding of said motor, part, at least, of said connections traversing said converting machine, a direct current motor mechanically coupled to said converting machine, and means for deriving energy in the form of alternating current from the secondary member of said motor, for adjusting the voltage thereof, for rectifying said current, and for supplying the same to said direct current motor.

5. A system of electrical distribution comprising a source of alternating current, a converting dynamo-electric machine, an induction motor, connections from said source to said converting machine and to the primary winding of said motor, part, at least, of said connections traversing said converting machine, a direct current motor mechanically coupled to said converting machine, a rectifier, and connections for deriving alternating current from the secondary winding of said induction motor, for rectifying the same in said rectifier and for supplying the same to said direct current motor.

6. A system of electrical distribution comprising a source of alternating current, a converting dynamo-electric machine, an induction motor, connections from said source to said converting machine and to the primary winding of said motor, part, at least, of said connections traversing said converting machine, a direct current motor mechanically coupled to said converting machine, a rectifier, an adjustable transformer and connections for deriving electrical energy from the secondary member of said induction motor for passing said energy through said transformer and said rectifier, and for supplying said energy to said direct current motor.

In testimony whereof, I have hereunto subscribed my name this 12th day of Mar. 1915.

FRIEDRICH W. MEYER.

Witnesses:
D. C. DAVIS,
B. B. HINES.